United States Patent [19]

Min

[11] Patent Number: 5,320,199
[45] Date of Patent: Jun. 14, 1994

[54] BRAKING DEVICE FOR A BICYCLE

[76] Inventor: Chen T. Min, P.O. Box 82-144, Taipei, Taiwan

[21] Appl. No.: 49,353

[22] Filed: Apr. 21, 1993

[51] Int. Cl.$^5$ ............................................. B62L 1/08
[52] U.S. Cl. ............................... 188/24.19; 188/24.22
[58] Field of Search ............... 188/24.11, 24.12, 24.19, 188/24.21, 24.22, 250 G

[56] References Cited

U.S. PATENT DOCUMENTS

| | | | |
|---|---|---|---|
| 4,938,318 | 7/1990 | Ishibashi | 188/24.19 |
| 5,133,432 | 7/1992 | Yoshigai | 188/24.22 X |
| 5,168,962 | 12/1992 | Yoshigai | 188/24.19 |

FOREIGN PATENT DOCUMENTS 461465 12/1991 European Pat. Off. ......... 188/24.12
931970 3/1948 France ........................ 188/24.22

Primary Examiner—Robert J. Oberleitner
Assistant Examiner—Kevin D. Rutherford
Attorney, Agent, or Firm—Alfred Lei

[57] ABSTRACT

This invention relates to a braking device for a bicycle and in particular to one including an arm provided with a slot at an intermediate portion, a shoe having a rod at one side, a ball having a hole extending through a center thereof and a slit on its surface, a screw formed with a ring portion at one end and a threaded portion at another end, a knob having at one end a neck with a center through hole for receiving the rod of the shoe and at another end a slot with a curved surface at both sides, the neck of the knob being adapted to be received in the slot of the arm, and a nut engaged with the threaded portion of the screw.

1 Claim, 5 Drawing Sheets

BRAKING DEVICE FOR A BICYCLE

BACKGROUND OF THE INVENTION

FIG. 5 shows a working view of a prior art braking device for a bicycle. As illustrated, when the upper cable 1 is pulled upward by the handle, the lower cable 11 will be also pulled upwards. Hence, the actuating seat 12 will be pulled to turn about pin 13 thereby forcing the shoe 14 to press on the rim 15 of a wheel. As shown in FIG. 6, the braking device includes an actuating seat 12, a shoe 14, and a packing 17 with an inclined surface. When it is desired to adjust the shoe 14, it is only necessary to rotate the packing 17 to an appropriate position. However, it is difficult to control the turning angle of the packing thereby causing much inconvenience in operation.

SUMMARY OF THE INVENTION

This invention relates to an improved braking device for a bicycle.

It is the primary object of the present invention to provide a braking device for a bicycle which is facile to adjust.

It is another object of the present invention to provide a braking device for a bicycle which is easy to assemble.

It is still another object of the present invention to provide a braking device for a bicycle which is simple in construction.

It is still another object of the present invention to provide a braking device for a bicycle which is economical to produce.

It is a further object of the present invention to provide a braking device for a bicycle which is low in manufacturing cost.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
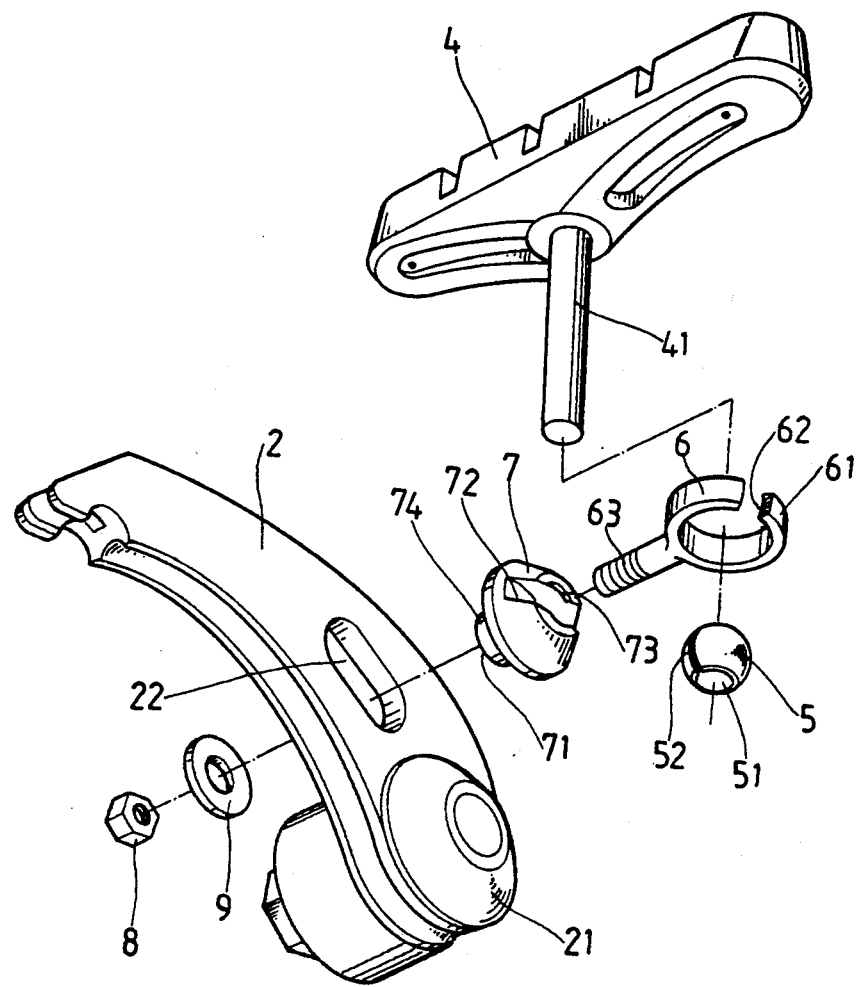
FIG. 1 is an exploded view of a braking device for a bicycle according to the present invention.

For purposes of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
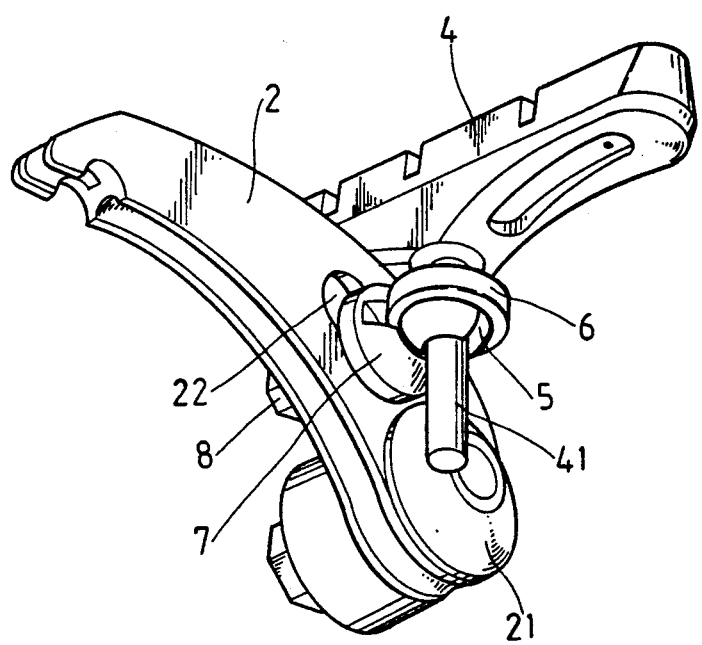
FIG. 2 is a perspective view of the present invention.
Figure 3:
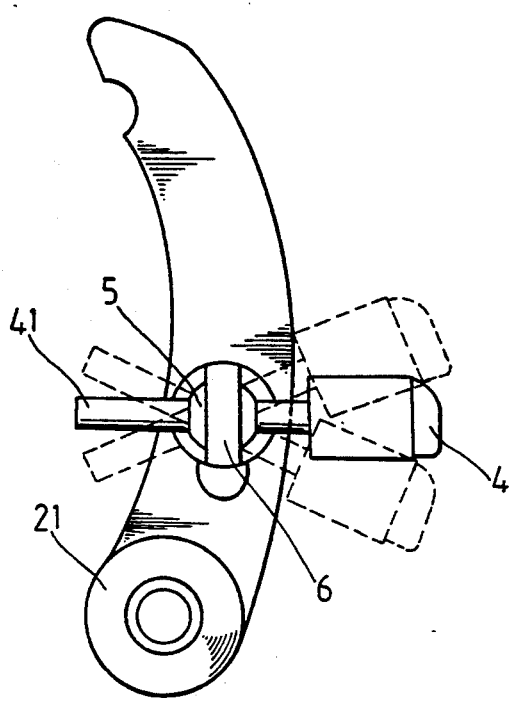
FIGS. 3 and 4 show the principle of the present invention.
Figure 4:
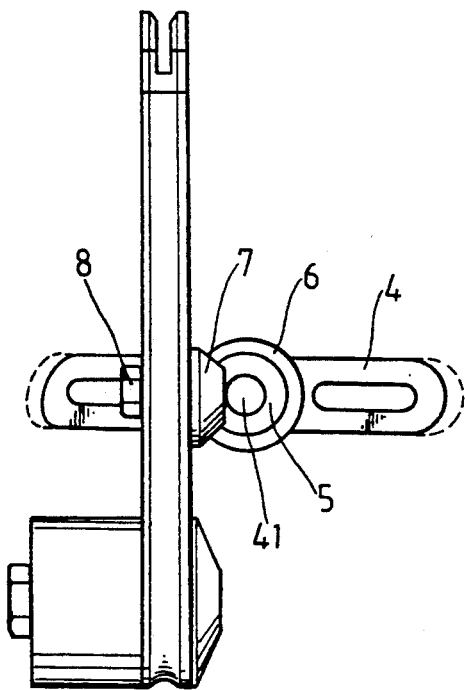
Figure 5:
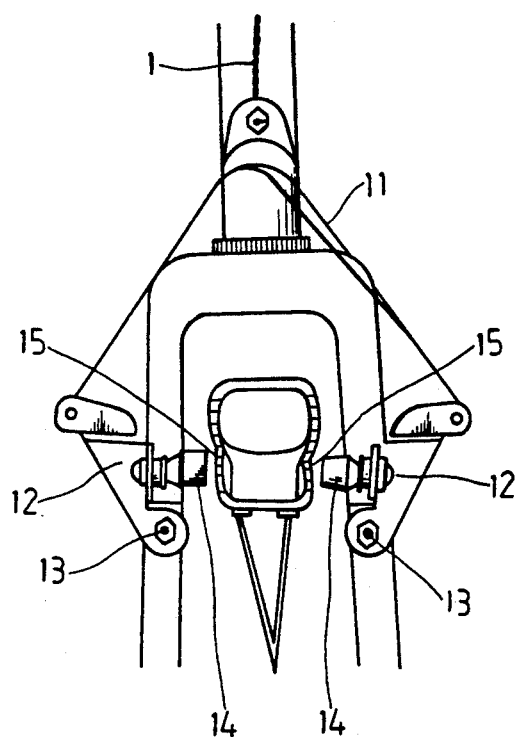
FIG. 5 is a working view of prior art braking device for a bicycle.
Figure 6:
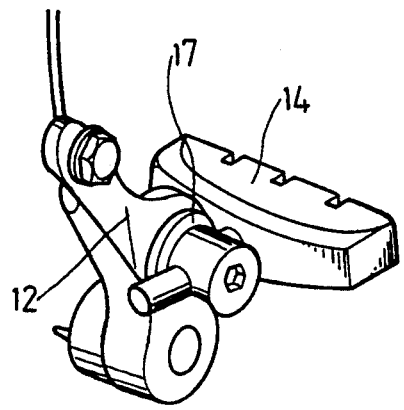
FIG. 6 is a perspective view of the prior art braking device.
Figure 7:
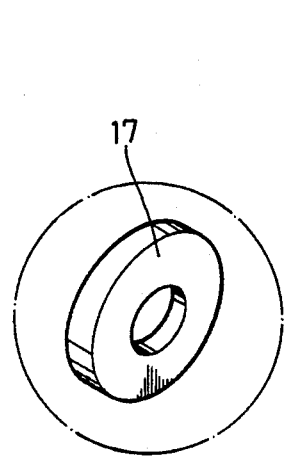
FIG. 7 shows a packing of the prior art braking device.
Figure 8:
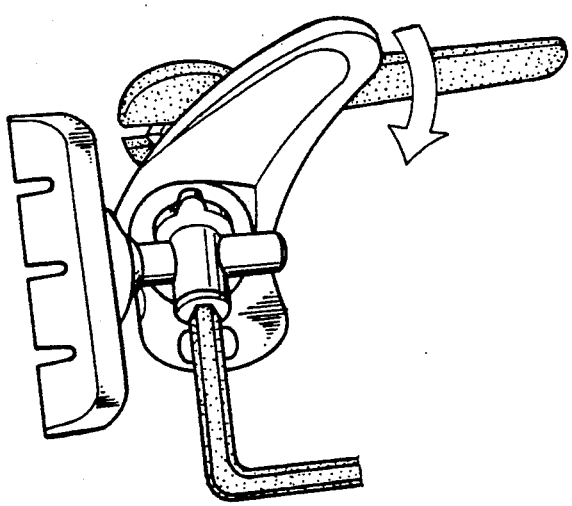
FIG. 8 is the way to adjust the prior art braking device.

With reference to the drawings and in particular to FIGS. 1 and 2 thereof, the braking device for a bicycle according to the present invention mainly comprises an arm 2, a shoe 4, a ball 5, a screw 6, a knob 7, and a nut 8.

The arm 2 is provided with a seat 21 at the lower end. The seat 21 is engageable with a front fork of a bicycle (not shown). Further, the arm 2 is formed at the intermediate portion with a slot 22 for engaging with the knob 7. The shoe 4 is provided with a rod 41 at its back. The ball 5 has a hole 51 extending through the center thereof and a slit 52 on its surface. The screw 6 has a ring portion 61 at one end and a threaded portion 63 at the other. The ring portion 61 is formed with a curved inner surface 62 so that the ball 5 may be kept in the ring portion 61. The knob 7 has a center through hole 71 for the passage of the threaded portion 63 and a slot 72 with a curved surface 73 at both sides for receiving the ring portion 61 of the screw 6 and the ball 5. Further, the knob 7 is formed with a neck 74 at the other end.

When in assembly, first insert the rod 41 of the shoe 4 into the hole 51 of the ball 5. Then press-fit the ball 5 together with the shoe 4 into the ring portion 61 of the screw 6. Thereafter, engage the knob 7 with the slot 22 of the arm 2. Then, insert the screw 6 into the knob 7 with its ring portion 6 and the ball 5 received in the slot 72 of the knob 7. Afterwards, engage a packing 9 and a nut 8 with the threaded portion 63 of the screw 6. Hence, the ball 5 will be compressed to hold the rod 41 of the shoe 4 tightly.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A braking device for a bicycle comprising:
   an arm provided with a slot at an intermediate portion and being engageable with a front fork of a bicycle;
   a ball having a hole extending through a center thereof and a slit on its surface;
   a shoe having a rod at one side, said rod being inserted into the hole of said ball;
   a screw formed with a ring portion at one end for receiving said ball and a threaded portion at another end;
   a knob having at one end a neck with a center through hole for receiving said screw and at another end a slot with a curved surface at both sides, the neck of said knob being adapted to be received in the slot of said arm; and
   a nut engaged with the threaded portion of said screw.

* * * * *